Aug. 9, 1960
H. M. STEELE
2,948,083
GUTTER SCREEN
Filed Dec. 2, 1955
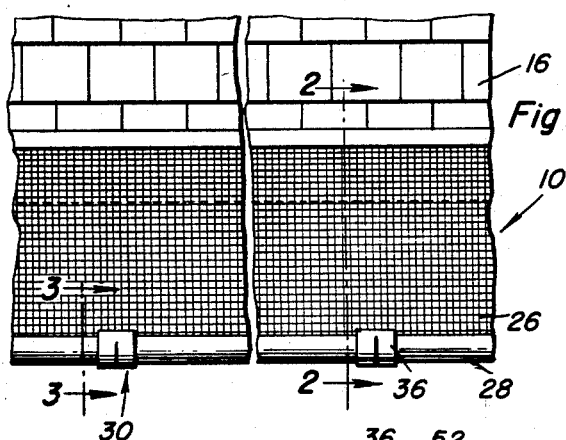
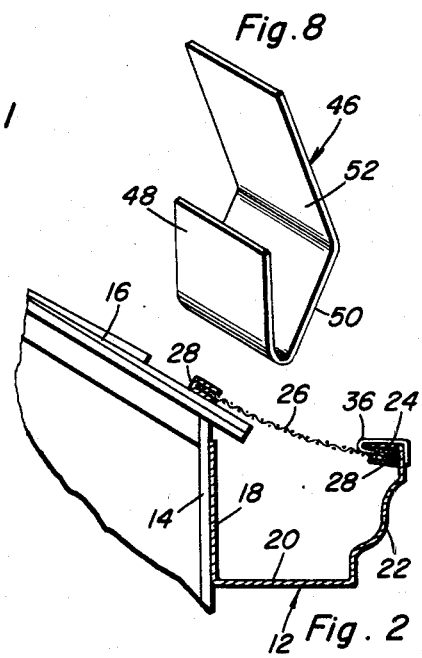
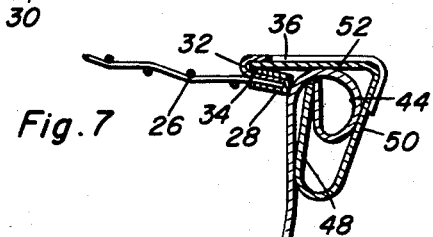
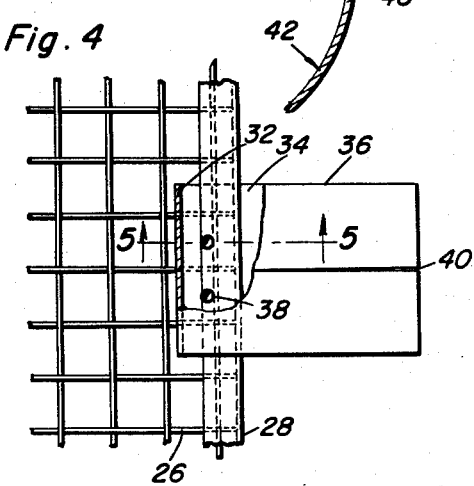
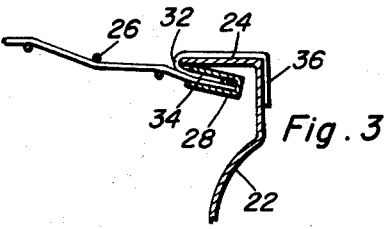
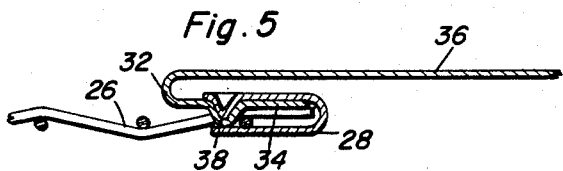
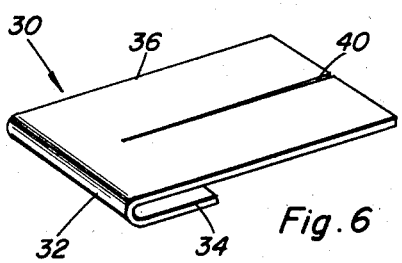
Homer M. Steele
INVENTOR.
BY *(signatures)*
Attorneys

United States Patent Office 2,948,083
Patented Aug. 9, 1960

2,948,083

GUTTER SCREEN

Homer M. Steele, 706 Bellefonte Princess Road,
Bellefonte, Ashland, Ky.

Filed Dec. 2, 1955, Ser. No. 550,691

1 Claim. (Cl. 50—5)

This invention generally relates to a gutter screen construction and more specifically provides a covering screen for an eaves trough for protection of the eaves trough or gutter thereby preventing the entry and collection of foreign material such as leaves or the like in the eaves trough with resultant damage to the eaves trough and overflawing thereof caused by such foreign objects.

Specifically, the above invention is a continuation-in-part of my copending application Serial No. 196,846, filed November 21, 1950 for Gutter Screen now Patent No. 2,734,467, issued February 15, 1956.

The primary object of the present invention is to provide a gutter screen adapted to overlie the gutter or eaves trough and includes a reticulated member extending throughout the length of the eaves trough together with a plurality of clip members for securing the reticulated member in overlying relation to the trough and retaining the free edge of the reticulated screen in spring urged contacting relation with the surface of the roof due to the inherent resiliency of the screen thereby assuring that no foreign material will become lodged or pass under the screen and still enter the eaves trough.

A further object of the present invention is to provide a gutter screen in accordance with the preceding object having improved and novel clip members which adapt the screen for attachment to the square or polygonal type of eaves troughs having inturned top edges or the semi-cylindrical type of eaves trough having an outwardly rolled outer edge thereby enhancing the utility and adaptability of the present invention.

Another very important object of the present invention is to provide a gutter screen with a plurality of clips attached thereto wherein the clips may be attached with very little effort and without use of any special tools other than those tools normally employed by various craftsmen thereby facilitating the assembly of the gutter screen with the eaves trough.

Other objects of the present invention will reside in its simplicity of construction, ease of installation, efficiency for its purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the gutter screen of the present invention illustrating a section of the gutter with the relationship of the roof and gutter screen illustrated;

Figure 2 is a detailed sectional view taken substantially upon a plane passing along section line 2—2 of Figure 1 illustrating the relationship of the eaves trough or gutter, the screen and the roof and specifically showing the concavity of the upper surface of the screen caused by flexing thereof when the screen is installed;

Figure 3 is an enlarged detail view taken substantially upon a plane passing along section line 3—3 of Figure 1 illustrating the relationship of the reinforcing bead, the screen, the inwardly extending edge of the gutter and the attaching clip;

Figure 4 is an enlarged plan view of the clip and screen with portions thereof broken away illustrating the structural relationship thereof;

Figure 5 is a detailed sectional view taken substantially upon a plane passing along section line 5—5 of Figure 4 illustrating the manner in which the clip members are attached to the gutter screen and the relationship of the elements thereof;

Figure 6 is a perspective view of the clip members per se;

Figure 7 is a detailed sectional view similar to Figure 3 illustrating an additional bendable hoop type clip for adapting the clip members for attachment to a rolled edge type of gutter; and Figure 8 is a perspective view of the hoop type clip employed in Figure 7 in conjunction with the clip member.

Referring now specifically to the drawings, the numeral 10 generally designates the gutter screen of the present invention which is employed in connection with a gutter or eaves trough generally designated by the numeral 12 which is attached to the vertical wall 14 of a building beneath the overhanging portion of a roof 16 for catching water discharged from the roof 16 in the usual manner.

As best seen in Figure 2, the gutter 12 includes a vertical inner wall 18 secured to the wall 14 of the building by any suitable fastening means (not shown). The gutter or eaves trough 12 also includes a bottom wall 20 and an upstanding outer wall 22 which may be inclined outwardly or provided with reinforcing ribs if desired. The upper end of the outer wall 22 is provided with an inturned or inwardly extending edge portion 24 which in this form of gutter is generally horizontal and is merely an inturned upper edge of the upstanding outer wall 22.

The gutter screen of the present invention includes a longitudinally elongated member of mesh screen 26 forming a reticulated member wherein the mesh is relatively large thereby leaving relatively large apertures for the passage of water therethrough but the apertures are not so large that they will permit foreign objects such as leaves, twigs or the like to pass into the gutter 12. The longitudinal screen member 26 is actually formed from a plurality of sections to permit convenience of shipping and handling wherein the sections are positioned in operative position in longitudinal abutting alignment for forming substantially a continuous gutter screen. The longitudinal screen member 26 is provided with reinforcing strips 28 along each longitudinal edge thereof with each of the strips 28 being generally U-shaped in configuration for clampingly overlying and engaging the free edges of the screen member 26 thereby rigidifying the screen member 26 and forming means for attachment of a plurality of supporting clips which are generally designated by the numeral 30 wherein the clip members 30 are utilized to attach the screen members 26 to the gutter 12 with the inner edge of the screen member 26 lying against the roof 16 and resiliently held against the roof surface.

Each of the clip members 30 includes a web 32 with a pair of side flanges 34 and 36 with one of the side flanges 34 being shorter than the other of the side flanges 36 wherein the side flange 34 is inserted between the mesh screen member 26 and the upper leg of the U-shaped reinforcing strip 28 at the outer edge of the screen member 26. The web portion 32 is disposed adjacent the inner edge of the upper leg of the reinforcing strip 28 and spaces the other flange 36 upwardly therefrom in substantially parallel relation. Inasmuch as the other flange 36 is longer than the one flange 34, the upper flange 36 extends outwardly into overlying engagement with the inturned edge 24 of the upstanding wall 22 of the gutter 12. The offset relation between the flanges 34 and 36 permits the inturned edge 24 of the gutter 12 to be inserted between the flanges into contacting relation with the inner surface of the web 32 of the clip members 30.

In order to secure the clip members 30 to the mesh screen member 26 and the reinforcing strip 28, the reinforcing strip 28 and the underlying portion of the one flange 34 is provided with inwardly struck detents 38 which extend through the mesh screen member 26 and engage the lower leg of the U-shaped reinforcing strip 28 thereby securely attaching the clip members 30 to the mesh screen member 26. Also, the elongated or other flange 36 of the clip members 30 may be provided with a longitudinally elongated slit 40 to divide the flange 36 into a pair of bendable legs thereby permitting easier bending of such legs although it will be understood that the slit 40 may be omitted if desired.

In the installation of the device as illustrated in Figures 1-6, the gutter screen members 26 are provided with the clips already attached thereto substantially in the shape and form as illustrated in Figure 5. The screen is then positioned with the inner reinforcing strip 28 disposed against the roof 16 and the other flange 36 lying loosely against the upper surface of the inturned edge 24. The outer strip 28 is then forced downwardly and the adjacent portion of the mesh screen 26 is formed in a concave manner substantially as illustrated in Figure 2 until the reinforcing strip 28 slips under the inturned edge 24 wherein the gripping relation between the strip 28 and the flange 36 will retain the mesh screen 26 in substantially concave relation for resiliently and forcefully holding the inner strip 28 against the roof 16 thereby assuring that no foreign objects will pass under the screen member 26 into the gutter 12. The free ends of the legs of the flange 36 may then be bent downwardly along the vertical portion of the upstanding wall 22 substantially as illustrated in Figure 3 thereby securely retaining the clip members 30 in position for retaining the screen members 26 in position whereby wind and other external forces cannot remove the screen members 26 from covering relation to the gutter 12.

As illustrated in Figures 7 and 8, another type of gutter or eaves trough is generally designated by the numeral 42 which is substantially semi-cylindrical in shape and which is provided with an outwardly rolled upper edge 44. For providing an inwardly extending upper edge portion, a clip generally designated by the numeral 46 is provided which is constructed with a lower looped end having a vertical upstanding portion 48 and an angularly inclined portion formed therewith designated by the numeral 50 and an elongated portion 52 attached to the inclined portion 50 all being of integral construction. The vertical portion 48 is disposed between the rolled edge 44 and the adjacent portion of the gutter 42 with the inclined portion 50 extending angularly into contacting relation with the outer edge of the rolled edge 44. The portion 52 is then bent into substantially horizontal relation for extending inwardly into the gutter 42 thereby forming an inwardly extending edge portion for the gutter 42 so that the clip members 30 may be employed for attaching the gutter screen 26 to the semi-cylindrical type of gutter 42.

In each instance, the inwardly extending edge portion, such as 24 in Figure 3 and 52 in Figure 7, permits attachment of the clip members 30 with the mesh screen 26 in downwardly flexed position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, an eaves trough disposed at the edge of a roof for receiving water therefrom, said eaves trough having an outer wall with a generally horizontal and inwardly extending edge portion, said edge portion having a flat upper and lower surface, a screen construction comprising an elongated mesh screen member constructed of resilient material, a U-shaped reinforcing strip on each longitudinal edge of the screen member, said screen member having the inner edge freely resting against the upper surface of the roof with the outer edge disposed adjacent to the inwardly extending edge portion thereby forming a complete covering screen for the trough for permitting entry of water into the trough, said screen forming substantially a continuation of the roof whereby leaves and other foreign material will be precluded from entry into the trough and will be discharged from the outer edge of the screen member and eaves trough, and means for attaching the outer strip of the screen member to the inwardly extending edge portion of the trough for urging the inner strip resiliently against the roof by maintaining the screen member in a slightly downwardly flexed condition, said means including a plurality of mounting clips rigidly mounted on the outer strip for engagement with the inwardly extending edge portion, each of said mounting clips being generally U-shaped and including a web and a pair of generally normally parallel legs extending therefrom, one of said legs being received and retained between the screen member and the reinforcing strip, said strip being provided with inwardly projecting detents extending into said one leg of the clip thereby rigidly mounting and interlocking the clip to the screen member, said outer strip on the screen member underlying the inwardly extending edge portion of the trough, the other leg of the clip engaging the flat upper surface of the inwardly extending edge portion of the trough in opposition to the area of engagement between the reinforcing strip and the flat lower surface of the inwardly extending edge portion of the trough, the other leg of the clip coacting with the strip on the screen member for clampingly engaging the screen member to the horizontally disposed inwardly extending edge portion of the trough thereby urging the screen member towards a horizontal position thus resiliently urging the inner strip on the screen member towards the roof and maintaining the screen member in a slightly downwardly flexed condition, said other leg of the clip extending beyond the inwardly extending edge portion of the gutter, the outer end of the other leg of the clip extending downwardly into engagement with the outer surface of the outer wall of the trough for preventing inward movement of the screen member in relation to the trough thereby securing the screen member in place.

References Cited in the file of this patent
UNITED STATES PATENTS

| | | |
|---|---|---|
| 1,526,821 | Andrews | Feb. 17, 1925 |
| 2,219,953 | Fry | Oct. 29, 1940 |
| 2,318,955 | Milnor | May 11, 1943 |
| 2,365,845 | Schweda | Dec. 26, 1944 |
| 2,423,923 | Audino | July 15, 1947 |
| 2,583,422 | Haddon | Jan. 22, 1952 |
| 2,810,173 | Bearden | Oct. 22, 1957 |